No. 696,596. Patented Apr. 1, 1902.
W. W. ROBINSON.
MOTOR VEHICLE.
(Application filed Apr. 26, 1899.)
(No Model.) 5 Sheets—Sheet 1.
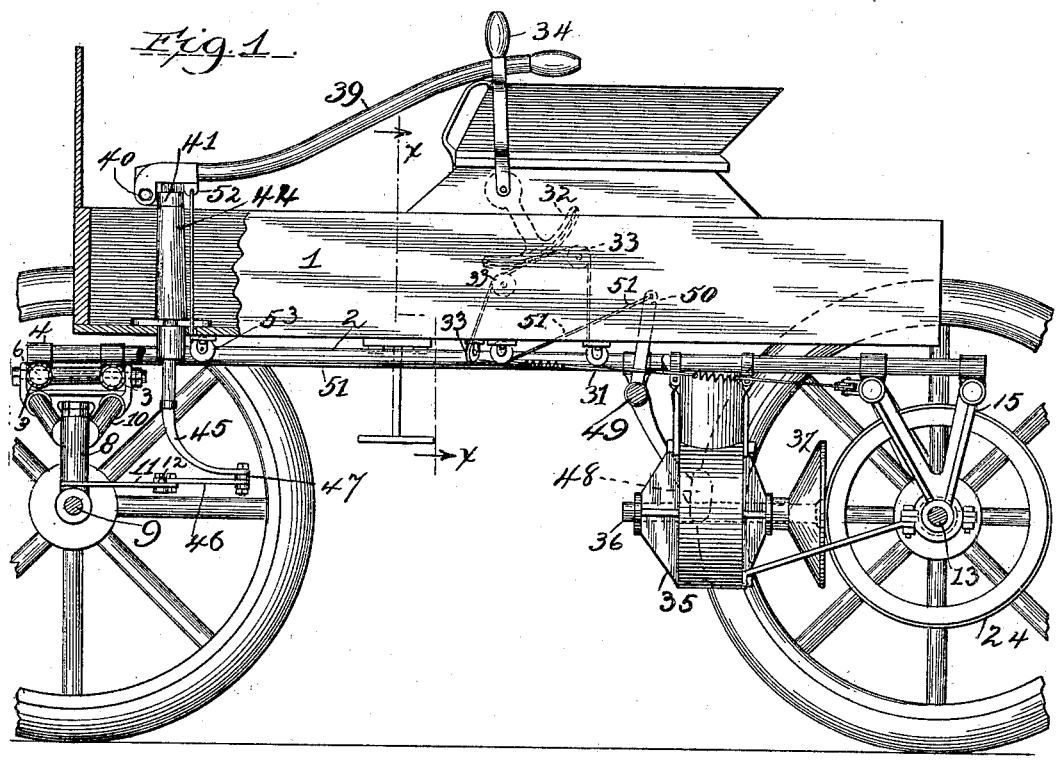
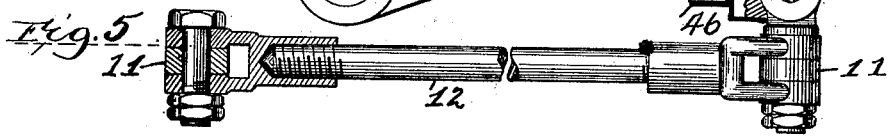
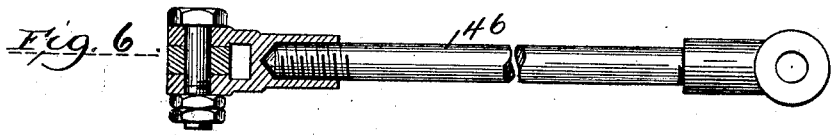
Witnesses:
Inventor:
Walter W. Robinson,
By Charles A. Brown & Crapo
Attorneys.
THE NORRIS PETERS CO., PHOTO-LITHO., WASHINGTON, D. C.

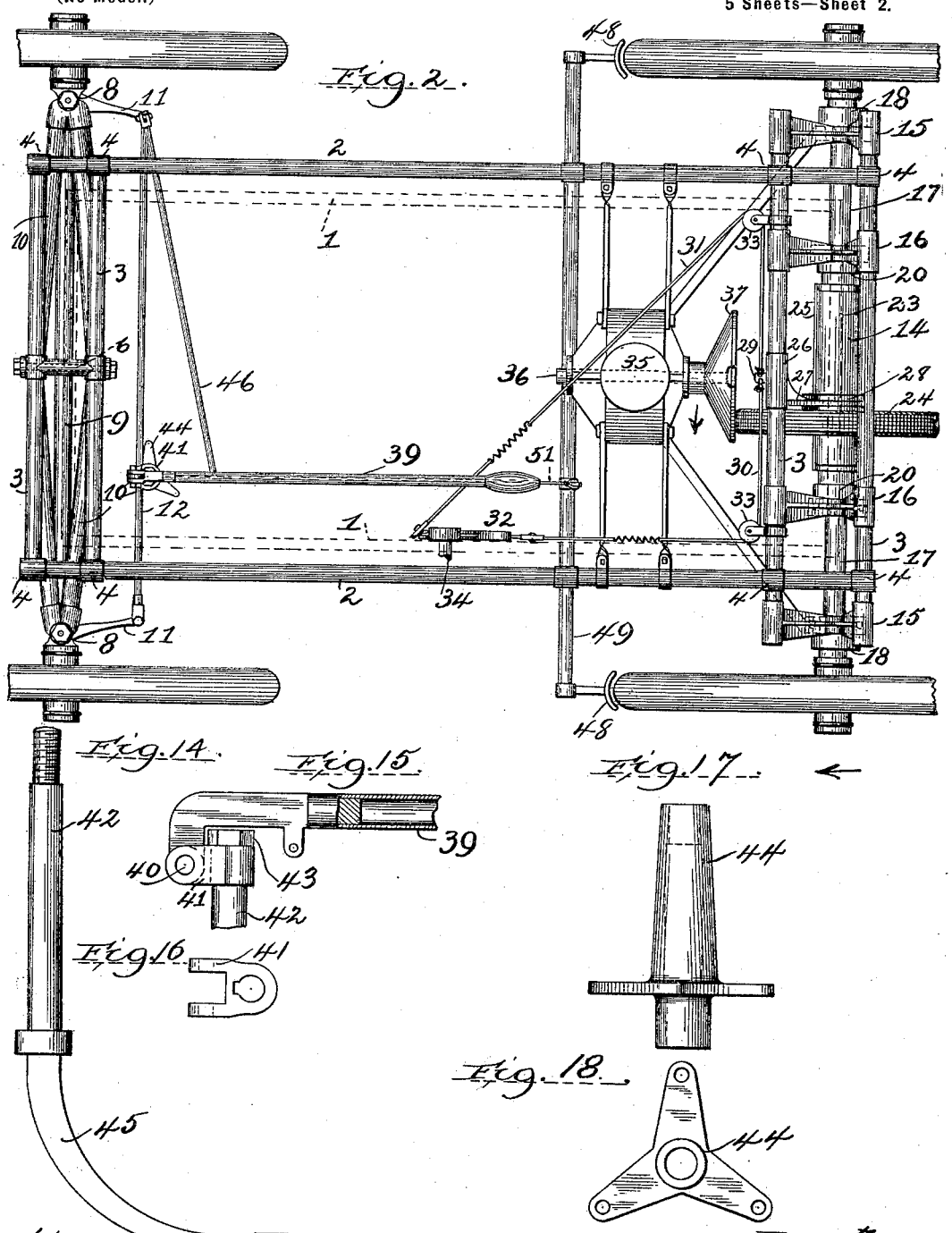

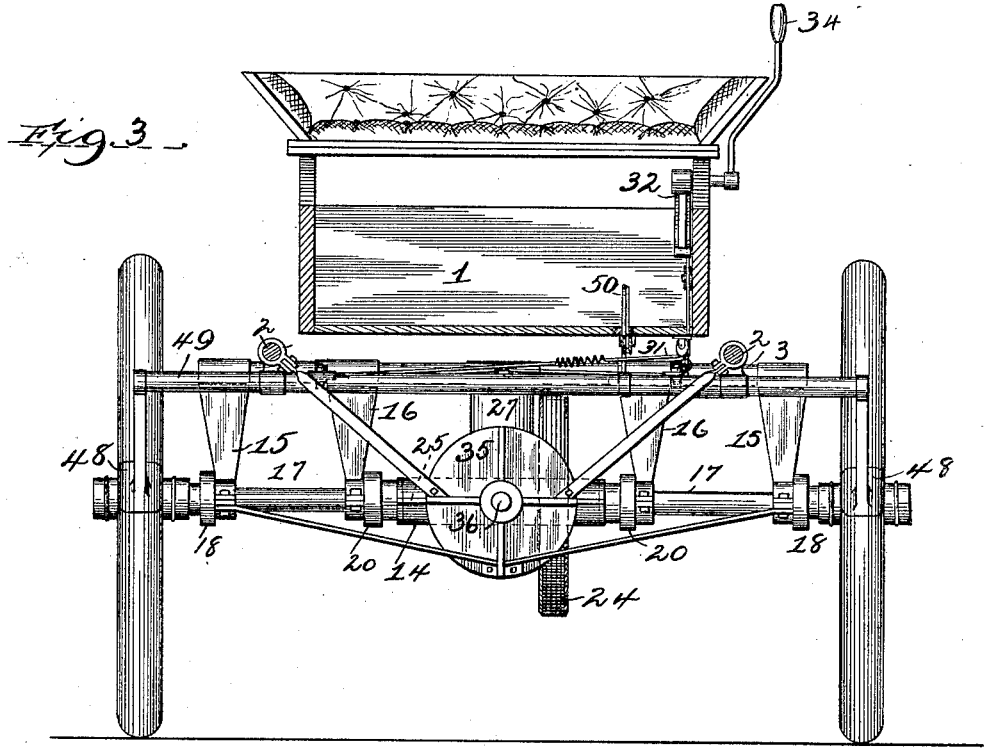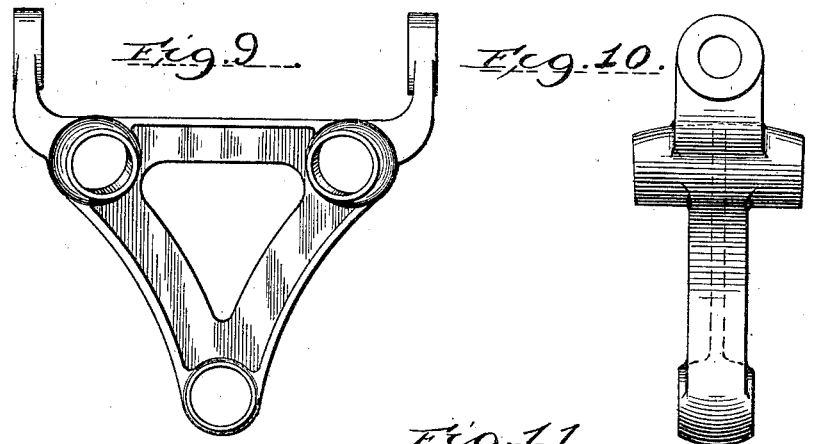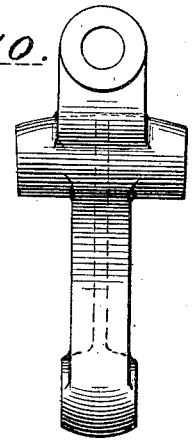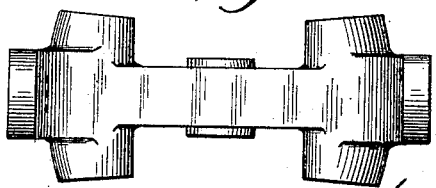

No. 696,596. Patented Apr. 1, 1902.
W. W. ROBINSON.
MOTOR VEHICLE.
(Application filed Apr. 26, 1899.)
(No Model.) 5 Sheets—Sheet 4.
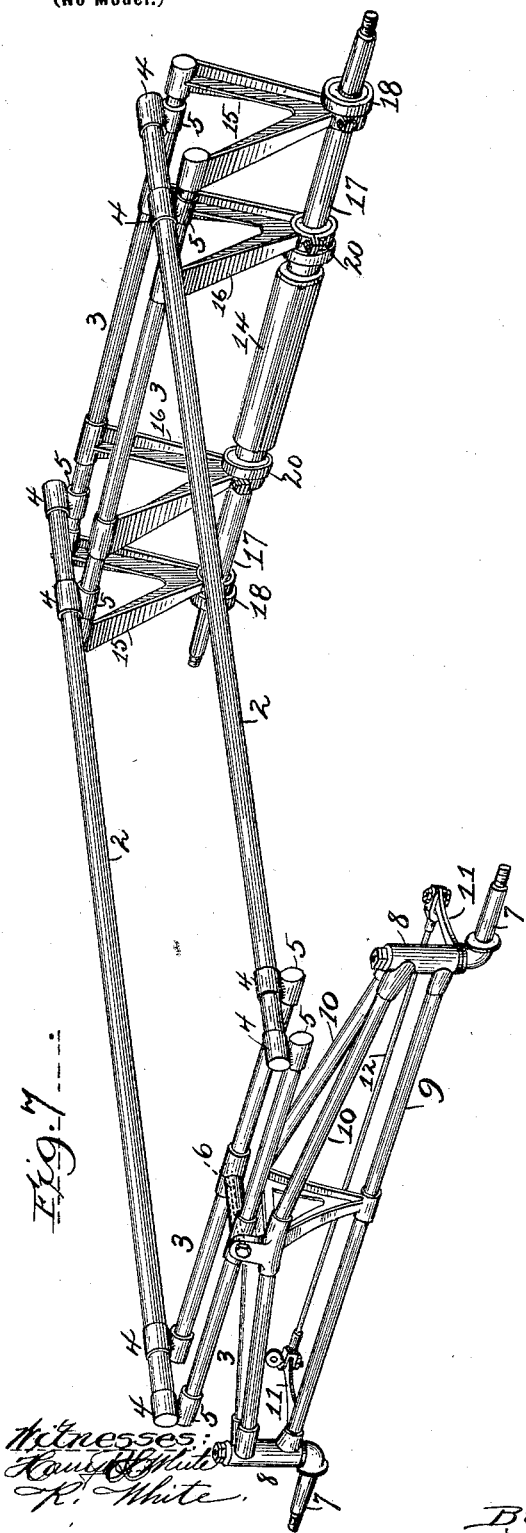
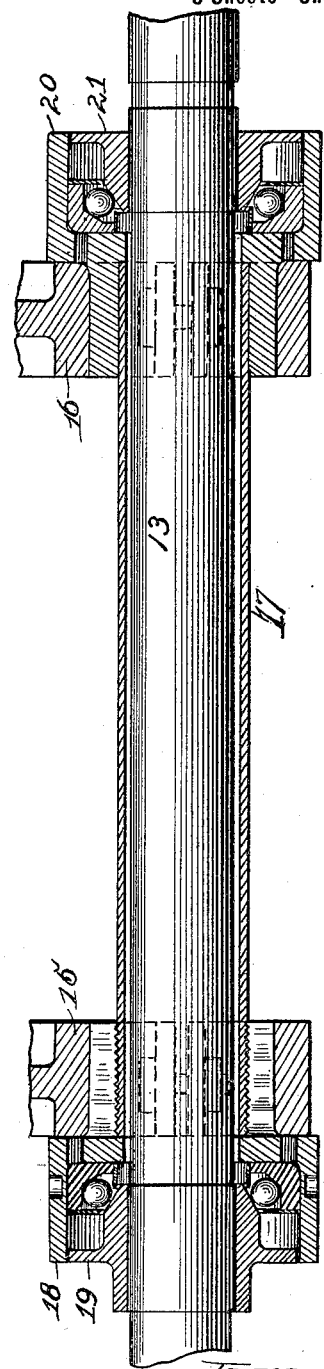

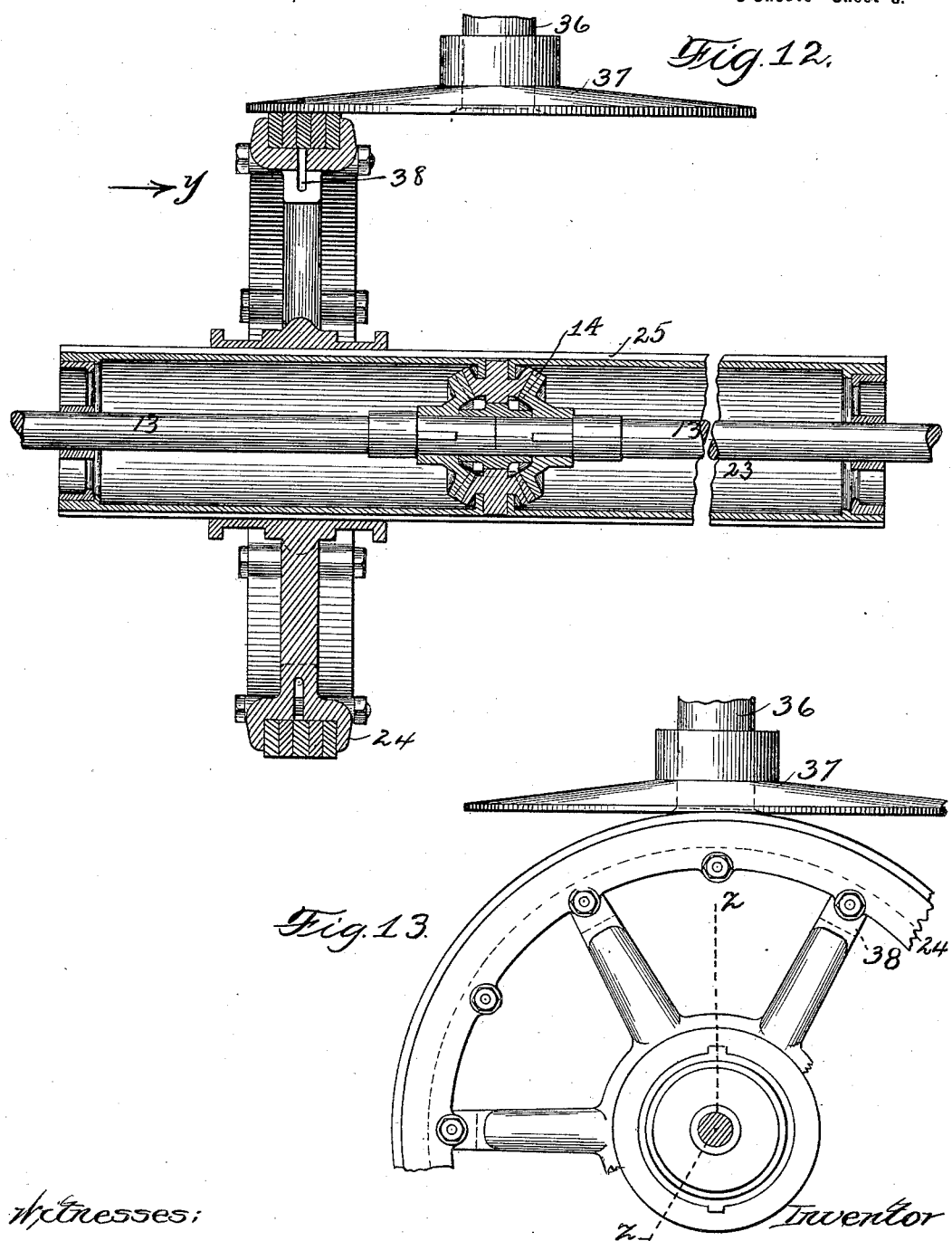

UNITED STATES PATENT OFFICE.

WALTER W. ROBINSON, OF CHICAGO, ILLINOIS.

MOTOR-VEHICLE.

SPECIFICATION forming part of Letters Patent No. 696,596, dated April 1, 1902.

Application filed April 26, 1899. Serial No. 714,528. (No model.)

*To all whom it may concern:*

Be it known that I, WALTER W. ROBINSON, a citizen of the United States, residing at Chicago, in the county of Cook and State of Illinois, have invented a certain new and useful Improvement in Vehicles, (Case No. 1,) of which the following is a full, clear, concise, and exact description, reference being had to the accompanying drawings, forming a part of this specification.

My invention relates to vehicles, and principally to motor-vehicles, although certain features of the invention may be employed in other than motor-driven vehicles.

The primary object of my invention is to construct a motor-vehicle in which the number of operating parts will be greatly reduced and in which the operating mechanism is of simple construction.

More particularly, the invention relates to the running-gear of motor-vehicles, to the motor mechanism, and to mechanism for controlling the operation of the motor and the movements of the vehicle.

One feature of the invention relates to mechanism for controlling the vehicle-brake and the direction of travel of the vehicle, and this feature of my invention, generally speaking, consists in a single operating-lever combined with suitable mechanism interposed between the steering and braking mechanisms, which lever, according to the manner of its operation, is adapted to operate the steering and braking appliances, whereby I am enabled to make a single lever perform the double function of controlling the direction of travel of the vehicle and of controlling the operation of the braking mechanism.

In accordance with a further feature of my invention I preferably employ an engine whose driving-shaft is rotated at a uniform rate of speed, suitable mechanism being interposed between the engine and the driving-shaft of the vehicle to vary the speed of the said vehicle-shaft as required. For governing the connection between the engine and driving-shaft of the vehicle I preferably employ a rocking lever which serves to actuate a segmental arm, attached to the ends whereof are operating-cords adapted to engage the periphery of the segmental arm, so that as the arm is rotated in one direction or the other the speed of the vehicle-shaft may be increased, diminished, stopped, or reversed, as required.

A third and very important feature of my invention resides in the mechanism which I employ in the construction of the driving-shaft of the vehicle and the gearing interposed between the same and the engine or motor. As is well known, differential couplings are essential upon the driving-shafts of vehicles. Difficulty, however, has been experienced in the past in properly transferring power from the motor to the driving-shaft sections thus united by differential coupling. Generally speaking, my improvement in this respect consists of a driving-shaft made up in sections and having suitable differential coupling for uniting the sections, a sleeve extending longitudinally of the shaft and surrounding the same, a friction-wheel adapted to travel longitudinally of the sleeve and preferably prevented from rotating with respect thereto by means of a feather or spline, whereby as the friction-wheel is moved longitudinally it rotates with the shaft, and a driving-wheel adapted, preferably, to rotate in a plane perpendicular to the plane of rotation of the shaft, this driving-wheel being preferably in the form of a friction-disk, which preferably has engagement with the periphery of the wheel upon the sleeve. By moving the friction-wheel toward or from the center of the driving friction-disk the speed of the vehicle-shaft may be increased and diminished. The center of the driving friction-disk is preferably hollowed out, so that when the driven friction-wheel is at the center of the driving friction-disk the driven shaft may not be rotated by the motor.

Another feature of the invention relates to the construction of the frame for supporting the operating parts of the vehicle and the vehicle-body.

I will explain my invention more particularly by reference to the accompanying drawings, in which—

Figure 1 is a side elevation of a motor-vehicle constructed in accordance with my invention, parts being broken away more clearly to show the construction. Fig. 2 is a plan view of the running-gear of the vehicle. Fig. 3 is a cross-sectional view on line *x x* of Fig.

1. Figs. 4, 5, and 6 are detail views of parts of the steering mechanism. Fig. 7 is a perspective view of the frame or truck of the running-gear. Fig. 8 is a view in elevation, partially in section, of the driving-shaft and the hangers therefor. Figs. 9, 10, and 11 are respectively side, front, and plan views of the support for the king-bolt and braces of the frame shown in Fig. 7. Fig. 12 is a sectional elevation on line z z of Fig. 13 of one form of driving friction-disk and the mechanism interposed between the same and the driven shaft of the vehicle, parts being shown in section. Fig. 13 is a view of the friction driving mechanism shown in Fig. 12 in the direction of the arrows y. Figs. 14, 15, 16, 17, and 18 are details showing the construction of the steering mechanism.

Like numbers indicate like parts throughout the different views.

I have illustrated my invention as being applied to a four-wheeled vehicle; but it is obvious that certain features thereof may be applied to vehicles having a greater or less number of wheels. The vehicle shown is known as a "runabout," the construction in this particular instance being light; but as features of the invention may be applied to vehicles of heavier construction and for carrying heavy loads it is obvious that the precise form and weight of the vehicle may be varied to meet different conditions.

The truck upon which the bed-body 1 is mounted and which supports the vehicle-wheels comprises, preferably, two longitudinally-disposed tubular members 2 2, united at each end by two transversely-arranged tubular members 3 3, sleeves 4 upon the tubes 2 being preferably brazed to the sleeves 5 upon the tubes 3 3 to form the joints between the longitudinal and transverse tubes. By reason of this construction both the longitudinal and cross tubular members extend, respectively, the entire length and width of the truck, thus insuring a structure of greater strength, since the said tubes are directly connected together at several points throughout their lengths. The forward axle of the vehicle is preferably adapted to swing in a vertical plane transverse to the line of travel, a king-bolt 6 being mounted within a central bearing carried by the tubes 3 3. The front wheels, which in this instance are the steering-wheels, are mounted to rotate upon individual shafts 7 7, each of which is provided with an angular extension journaled in vertical bearings 8. The vertical bearings are united at their lower ends by a tube 9, which is preferably straight, and by two tubes 10 10, which diverge toward the king-bolt and extend upwardly away from the said bearings. The vertical portions of the individual shafts are provided with horizontal extensions 11, which are linked together by a coupling-rod 12. It is through the agency of this coupling-rod that the wheels are steered, as will be hereinafter more fully set forth. The rear shaft, being the driven shaft, is made up in sections 13 13, which are united by a suitable form of differential coupling 14, as will be more fully explained hereinafter. The rear shaft is supported in alined bearings carried by hangers 15 15 16 16, extending downward from the rear transverse tubes 3 3. These hangers are preferably V-shaped, the upper ends of the hangers having engagement with the transverse tubes 3 3 by means of sleeves carried by the hangers and inclosing the said tubes. I preferably provide ball-bearings for the rear axle, the construction of which is most clearly shown in Fig. 8, which illustrates that portion of the shaft interposed between the hangers 15 and 16 and the bearings supported by the said hangers.

Referring more particularly to Figs. 7 and 8, the outer portions of the shaft between the hangers 15 16 15 16 are inclosed by tubes 17 17, Fig. 8 illustrating the left-hand portion of the rear shaft, as seen in Fig. 7. The tube 17 (shown in Fig. 8) extends between the hangers 15 and 16 and through the agency of intermediate parts is clamped to the said hangers. The cylindrical cap 18 has its reduced extension clamped by the split sleeve of the hanger 15, suitable clamping-bolts being provided for uniting the halves of the said sleeve. The reduced extension of the cylindrical cap 18 preferably has threaded engagement with the sleeve 17 for the purpose of adjustment. Interposed between the cylindrical cap and the shaft-section 13 is a ball-bearing mechanism 19, preferably of the construction illustrated. The cylindrical cap 20 is preferably forcibly driven into engagement with the sleeve 17. The reduced extension of the cylindrical cap 18 is preferably slotted longitudinally, so that after the adjustment of the cap has been effected it may be maintained by the clamping action of the split sleeve of the hanger 15 engaging the same. By this construction I am enabled to secure a very accurate adjustment of the space between the bearings carried by the hangers. This adjustment is secured by screwing but one—namely, the outer—of the two caps 18 20 upon the threaded portion of the tube 17. Extreme rigidity for the driving-shaft is also obtained by providing a plurality of hangers engaging the shaft at different points throughout its length, within which hangers are provided suitable ball or roller bearings, wherein the shaft is rotated, as above described.

The frame or truck of the vehicle that I have thus particularly described is of very simple construction and is of great strength. No auxiliary devices are needed in my construction for guiding the individual shafts 7 and the member of the truck upon which they are mounted in a vertical plane, crab-jaws or similar devices that have been heretofore largely used for this purpose not being required. The axial adjustment of the rear shaft with relation to the truck or frame of the running-gear by means of the V-shaped hangers, the transverse tubes 3 3, and the sleeves carried by the hangers is fixedly maintained.

Any suitable form of differential coupling may be employed for uniting the sections of the driven shaft of the vehicle. In Figs. 12 and 13 I have shown a well-known form of coupling 14, employing miter-gears. I provide means for engaging the friction-wheel with the differential coupling and at the same time for guiding the said friction-wheel longitudinally of the coupling and the driving-shaft associated therewith, which consists in a longitudinal guide, preferably in the form of a housing 23, extending longitudinally of the shaft. The housing or extension is preferably cylindrical, although it may have other shape. Upon this housing I mount a driving-wheel 24, which is adapted to travel longitudinally upon the housing, which is preferably elongated for the purpose, but which preferably does not rotate with respect thereto. I preferably guide the driving friction-wheel 24 in its longitudinal travel upon the housing by means of a spline 25.

Referring to Figs. 1, 2, and 3, I provide a sleeve 26 upon one of the tubes 3, the sleeve being movable longitudinally upon the tube, an extension 27 engaging an annular groove in the hub 28 of the friction-wheel 24. An ear 29 upon the sleeve 26 is provided, to which ear one end of each of the cords 30 and 31 is attached, the other ends of said cords being attached to the rocker-arm 32, said cords being passed over guiding pulleys or idlers 33. A hand-lever 34, arranged near the seat of the vehicle, is provided for rotating the segmental rocker-arm 32. By thrusting the upper end of the lever 34 toward the front of the vehicle the friction-wheel 24 will be moved toward the right-hand side of the vehicle. The cords or equivalent devices 30 31 are each composed in part of a coiled spring to permit of the extension of the said cords upon the vibrations of the vehicle-body.

I have shown an engine or motor 35, which may be of any preferred kind and construction. I prefer to employ a gasolene-engine. The working shaft 36 of the engine has a driving friction-disk 37 mounted upon the rear end thereof. This driving friction-disk is preferably hollowed at its central portion, as indicated most clearly in Figs. 12 and 13. The friction-wheel 24 is adapted to make engagement with the face of the friction-disk as the friction-wheel is moved from side to side, except at the central portion of the friction-disk. Assuming the friction-disk to be rotating in the direction indicated by the arrows and the friction-wheel 24 to be in the position indicated, the driving-shaft of the vehicle will be traveling in a direction to move the vehicle forward. By gradually depressing the upper end of the lever 34 to an intermediate position toward the dashboard the speed of the vehicle will be gradually reduced until the rim of the friction-wheel 24 is in line with the axis of the driving-shaft 36, whereupon the engagement between the friction-disk and the friction-wheel will cease. To reverse the direction of the vehicle, the upper end of the hand-lever 34 is still further depressed to bring the friction-wheel toward the right of the shaft 36, the speed of the vehicle in a rearward direction being increased as the disk is being moved in a right-hand direction from the shaft 36. The friction-wheel 24 is preferably constructed as shown in Figs. 12 and 13.

A peripheral groove is provided in the friction-wheel 24, in which are placed a number of annular strips of suitable material, preferably leather. As it is difficult to make these annular strips of uniform thickness throughout, I provide an improved means for clamping the strips together at intervals, which consists in providing a central slot 38 through the rim of the wheel, this slot being continued partially through the spokes of the wheel, as shown. A number of clamping-bolts are passed through the rim beneath the annular strips. The slot through the rim and the spokes permits the clamps to act independently of each other to such an extent that the leather strips may be firmly bound in place even though they are not of uniform thickness throughout.

I will next describe my improved steering and braking mechanism. For controlling the operation of the steering and braking mechanism I employ a hand-lever 39, which is pivotally secured at 40 to a bracket 41, secured to the vertical steering-rod 42 by a nut 43, engaging the reduced threaded extension of said steering-rod. The said steering-rod is disposed within the vertical bearing 44, (shown in Figs. 1, 17, and 18,) the bore whereof is preferably of larger diameter than the steering-rod, except at the end portions, which end portions of the bore afford bearing-surfaces for the steering-rod. The steering-rod 42 is provided with a lower curved extension 45, connected with one end of the link 46 by a coupling 47, the other end of which link is connected with the coupling-rod 12 at the point of pivotal connection of said coupling-rod with one of the extensions 11. By turning the handle 39 in a horizontal plane rotary motion may be communicated to the extensions 11, and thereby to the individual shafts upon which the front wheels are mounted, whereby these wheels may be directed in their travel.

By means of my invention I am enabled to use this same steering-lever 39 to control the application of the brake. Two brake-shoes 48 48 are mounted upon a common brake-shaft 49, mounted to rotate in suitable bearings. A lever-arm 50 is fixed with relation to the shaft and extends upwardly. A cord or equivalent device 51 is connected at one end to the upper end of the arm 50 and at the other end to an ear 52 upon the lever 39, suitable idlers 53 being provided to guide the cord.

Upon the rotation of the free end of the lever 39 in a vertical plane the ear 52 will also be elevated, the brakes thereupon being applied. When it is desired suddenly to check the speed of the vehicle, the brake may be applied, and simultaneously the friction-wheel 24 may be shifted to the other side of the axis of the driving-shaft 36.

By means of the various instrumentalities that I have employed I am enabled greatly to simplify the construction of motor-vehicles, and as it is obvious that changes may readily be made in the details of construction of the various mechanisms I do not wish to be limited to the precise form and construction of the apparatus shown, and more particularly do I not wish to be limited to the precise way of engaging the wheel 24 with the driving-shaft of the vehicle.

Having, however, thus described my invention, I claim as new and desire to secure by Letters Patent—

1. The combination, with a shaft 13, of a tube 17 surrounding the same, hangers or supports 15, 16, for said tube, caps 18, 20, provided upon said tube, the former having a screw adjustment thereon with respect to the latter, which is fixedly mounted upon the tube, and roller or ball bearings interposed between said caps and the shaft, adapted to be adjusted by rotating the cap 18, substantially as described.

2. The combination, with a shaft 13, of a tube 17 surrounding the same, hangers or supports 15, 16, for said tube, caps 18, 20, provided upon said tube, said cap 18 being split and having a screw adjustment upon the tube, and cap 20 being fixedly mounted thereon, roller or ball bearings interposed between the said caps and the shaft, adapted to be adjusted by the rotation of cap 18 upon its screw-thread, and means for clamping said cap 18 in its position of adjustment upon the shaft, substantially as described.

3. In a frame for vehicles, the combination, with a shaft 13, of a tube or sleeve 17 surrounding the same, brackets or supports for said sleeve, caps 18, 20, provided upon the said sleeve, the former having a screw adjustment thereon and having a split portion extending within one of the brackets or supports, and the latter being fixedly mounted with respect to the sleeve, roller or ball bearings interposed between said caps and the shaft, adapted to be adjusted by the rotation of cap 18 on its screw-thread, and means provided upon one of said supports for clamping the cap 18 in its position of adjustment, substantially as described.

4. In a vehicle-truck, the combination, with longitudinal tubular members extending the entire length of the frame and suitably united at one end of the frame, of two transverse tubular members extending the entire width of the frame uniting the said longitudinal members at the other end of the frame, V-shaped hangers extending downwardly from said transverse member and serving to support a vehicle-shaft at their lower ends, sleeves 17 secured in position by said hangers, a vehicle-shaft passing through said sleeves, and bearings interposed between the sleeves and the shaft, substantially as described.

5. In a vehicle-truck, the combination, with longitudinal tubular members extending the entire length of the frame and suitably united at one end of the frame, of two transverse tubular members extending the entire width of the frame uniting the said longitudinal members at the other end of the frame, V-shaped hangers disposed upon either side of each of said longitudinal members and extending downwardly from the transverse members, said hangers serving to support a vehicle-shaft at their lower ends, sleeves 17 secured in position by said hangers, a vehicle-shaft passing through said sleeves, and bearings interposed between the sleeves and the shaft, substantially as described.

6. In a vehicle of the class described, the combination, with individual shafts 7, 7, for supporting the wheels of the vehicle, of a mounting for each of said shafts, permitting them to rotate substantially in horizontal planes, link mechanism uniting said shafts, whereby they are caused to rotate in unison, a steering-rod 42, a bracket or extension 41 carried by said steering-rod, a controlling-lever 39 pivoted to said bracket and adapted to be swung or rotated in two different planes, a link 46 connecting the steering-rod with the guide-wheels, whereby upon the movement of the lever in one plane the guiding-wheels of the vehicle are controlled as to their lines of travel, braking mechanism, and a flexible cord or member extending over idlers connecting said braking mechanism and lever, whereby upon the movement of the lever in the longitudinal plane said braking mechanism is actuated through the medium of the cord, substantially as described.

7. The combination with a driving friction-disk 37, of a longitudinally-movable friction-wheel 24 whose periphery engages or is adapted to engage the friction-disk, means for shifting the latter wheel longitudinally, a segmental rocker-arm 32, and cords united at their ends with the periphery of the rocker-arm and with the said means, the rocker-arm thereby being adapted by its movement in alternative directions to move the wheel 24 longitudinally in alternative directions, whereby the speed of the said wheel may be varied and reversed as desired, substantially as described.

8. The combination with a driving friction-disk 37, of a longitudinally-movable friction-wheel 24 whose periphery engages or is adapted to engage the friction-disk, means for shifting the latter wheel longitudinally, a segmental rocker-arm 32, cords united at their ends with the periphery of the rocker-arm and with the said means, the rocker-arm thereby being adapted by its movement in alternative directions to move the wheel 24 longitudinally in alternative directions, whereby the speed of the said wheel may be varied and reversed as desired, a sectional shaft surrounded by the friction-wheel 24, and a differential coupling uniting the sections of said shaft and interposed between the same and the said wheel 24, substantially as described.

9. The combination with a shaft, of a sleeve surrounding the same, a cap 18, an extended portion whereof is provided with slots, said extended portion having threaded engagement with said sleeve, a clamp engaging the extended portion and adapted to secure the same in its threaded engagement with the sleeve, and a bearing interposed between the cap and the shaft, substantially as described.

10. The combination with a shaft, of a sleeve surrounding the same, a cap 18, an extended portion whereof is provided with slots, said extended portion having threaded engagement with said sleeve, a hanger for the shaft having clamping engagement with said extended portion of the cap and adapted to secure the same in its threaded engagement with the sleeve, and a bearing interposed between the cap and the shaft, substantially as described.

11. In a vehicle-truck, the combination with transverse members 3 3, of downwardly-extending members 10 10 converging at their outer ends and located beneath the transverse members, a king-bolt disposed longitudinally of the vehicle and pivotally uniting the latter members with the first-aforesaid members, vertical bearings 8 8 united by said members 10 10, a member 9 disposed below the members 10 10 and also uniting the bearings 8 8, individual shafts 7 7 provided with vertical extensions located within the bearings 8 8, and steering mechanism for rotating the said individual shafts in their bearings, substantially as described.

12. In a vehicle, the combination with a driving-shaft formed in sections, of a differential coupling uniting said sections, an elongated portion rotatable with the differential coupling, a wheel 24 movable longitudinally of said elongated portion and having engagement therewith, a motor for rotating said wheel, the speed of which wheel is controlled by its longitudinal position with relation to the said portion, and means for shifting the said wheel longitudinally of the said portion, substantially as described.

13. In a vehicle, the combination with a driving-shaft formed in sections, of a differential coupling uniting said sections, an elongated portion rotatable with the differential coupling, a wheel 24 inclosing the shaft and engaging and movable longitudinally of the elongated portion, a driving-disk 37 engaging or adapted to engage the wheel 24, the speed of which latter wheel is controlled by its position relative to the center of the disk 37, and means for moving the wheel 24 longitudinally of said elongated portion, substantially as described.

14. In a vehicle, the combination with a driving-shaft formed in sections, of a differential coupling uniting said sections, an elongated portion rotatable with the differential coupling, a wheel 24 inclosing the said portion and shaft and engaging and movable longitudinally of the elongated portion, a driving-disk 37 engaging or adapted to engage the periphery of the wheel 24, the speed of which latter wheel is controlled by its position relative to the center of the disk 37, and means for driving the wheel 24 longitudinally of said elongated portion, substantially as described.

15. In a vehicle, the combination with a driving-shaft formed in sections, of a differential coupling uniting said sections, an elongated housing rotatable with the differential coupling, a wheel 24 inclosing the said housing and shaft and engaging and movable longitudinally of the elongated housing, a driving-disk 37 engaging or adapted to engage the periphery of the wheel 24, the speed of which latter wheel is controlled by its position relative to the center of the disk 37, and means for driving the wheel 24 longitudinally of said elongated housing, substantially as described.

16. In a friction-wheel, the combination with an annularly-grooved rim of the wheel provided with a central annular slot through the rim, of a series of clamps located about the rim of the wheel, and an annular strip or strips of friction material located in the groove of the rim and secured in place by the said clamps, substantially as described.

In witness whereof I hereunto subscribe my name this 19th day of April, A. D. 1899.

WALTER W. ROBINSON.

Witnesses:
GEORGE L. CRAGG,
CHARLES E. HUBERT.